(12) United States Patent
Katsuragi et al.

(10) Patent No.: US 6,513,922 B2
(45) Date of Patent: Feb. 4, 2003

(54) INK, INK-JET INK, METHOD FOR REDUCING KOGATION ON SURFACE OF HEATER OF INK-JET RECORDING HEAD, METHOD FOR INK-JET RECORDING, INK-JET RECORDING APPARATUS, RECORDING UNIT AND METHOD FOR PROLONGING INK-JET RECORDING HEAD LIFE

(75) Inventors: Ryuji Katsuragi, Tokyo (JP); Makoto Shioya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/840,234

(22) Filed: Apr. 24, 2001

(65) Prior Publication Data

US 2002/0005885 A1 Jan. 17, 2002

(30) Foreign Application Priority Data

Apr. 26, 2000 (JP) ........................... 2000-125483

(51) Int. Cl.$^7$ ................................................. B41J 2/01
(52) U.S. Cl. .................... 347/100; 347/96; 347/101
(58) Field of Search ..................... 347/100, 96, 101; 106/31–58

(56) References Cited

U.S. PATENT DOCUMENTS

| 4,968,992 A | | 11/1990 | Komuro ..................... 346/1.1 |
| 4,990,939 A | * | 2/1991 | Sekiya et al. ............... 347/100 |
| 5,062,892 A | * | 11/1991 | Halko ....................... 106/31.58 |
| 5,441,561 A | | 8/1995 | Chujo et al. ............... 106/20 C |
| 5,462,590 A | | 10/1995 | Yui et al. ................... 106/20 R |
| 5,609,671 A | | 3/1997 | Nagasawa ................. 106/20 R |
| 5,679,143 A | | 10/1997 | Looman ..................... 106/20 R |
| 5,702,510 A | * | 12/1997 | Yoshida et al. ............. 347/100 |
| 5,714,993 A | | 2/1998 | Keoshkerian et al. ......... 347/95 |
| 5,973,025 A | | 10/1999 | Nigam et al. ............... 523/160 |
| 5,998,501 A | | 12/1999 | Tsutsumi et al. ........... 523/160 |
| 6,048,390 A | | 4/2000 | Yano et al. ................ 106/31.43 |
| 6,394,594 B1 | | 5/2002 | Katsuragi et al. ........... 347/100 |
| 6,425,659 B1 | | 7/2002 | Katsuragi et al. ............. 347/56 |

FOREIGN PATENT DOCUMENTS

| EP | 0 525 787 A2 | 2/1993 |
| EP | 0 650 838 A2 | 5/1995 |
| EP | 0 719 846 A2 | 7/1996 |
| EP | 0 863 005 A1 | 9/1998 |
| EP | 0 909 798 A1 | 4/1999 |
| EP | 0 911 374 A1 | 4/1999 |
| EP | 1 029 680 A2 | 8/2000 |
| EP | 1 125 993 A2 | 8/2001 |
| GB | 2 332 438 A | 6/1999 |
| JP | 54-51837 A | 4/1979 |
| JP | 3-160070 | 7/1991 |
| JP | 5-186704 A | 7/1993 |
| JP | 6-220386 A | 8/1994 |
| JP | 7-268262 A | 10/1995 |
| JP | 8-3498 A | 1/1996 |
| JP | 9-143414 A | 6/1997 |
| JP | 10-36735 A | 2/1998 |
| JP | 10-273610 A | 10/1998 |
| JP | 10-279873 A | 10/1998 |
| JP | 11-256083 A | 9/1999 |

OTHER PUBLICATIONS

Output Hardcopy Devices by Robert C. Durbeck.*
Output Hardcopy Devices by Robert C. Durbeck, Chpter: 13; p. 311–370.*

* cited by examiner

Primary Examiner—John Barlow
Assistant Examiner—Manish S. Shah
(74) Attorney, Agent, or Firm—Fitzpatrick, Cella, Harper & Scinto

(57) ABSTRACT

An ink for ink-jet recording which comprises (a) a coloring material, (b) a liquid medium, (c) a compound selected from the group consisting of polyphosphoric acid, dicarboxylic acid, polyaminocarboxylic acid, aldonic acid, hydroxycarboxylic acid, polyolphosphate and salts thereof, and (d) an acid having an amino group and/or a salt thereof, the use of which reduces kogation of the ink-jet head heater having an outermost protecting layer containing at least one of a metal and a metal oxide.

5 Claims, 3 Drawing Sheets

INK, INK-JET INK, METHOD FOR REDUCING KOGATION ON SURFACE OF HEATER OF INK-JET RECORDING HEAD, METHOD FOR INK-JET RECORDING, INK-JET RECORDING APPARATUS, RECORDING UNIT AND METHOD FOR PROLONGING INK-JET RECORDING HEAD LIFE

BACKGROUND OF THE INVENTION

1. Field of the Invention

This invention relates to an ink, an ink-jet ink, a method for decreasing kogation on the surface of a heater for heat application to the ink, a method for ink-jet recording, an ink-jet recording apparatus, a recording unit, and a method for increasing life of the ink-jet recording head.

2. Related Background Art

There have been proposed various types of ink-jet recording method. According to an ink-jet recording method, such as the so-called bubble-jet recording method described in, for example, Japanese Patent Application Laid-Open No. 54-51837, ink is ejected in the form of ink droplets by the action of thermal energy. A feature of the ink-jet method is that high quality images can be formed on plain paper having no special coating layer at high speed and at low cost, due to the very simple structure of the high-density multi-nozzles. In this method, rapid heating of the heater in the recording head induce bubble generation in the liquid on the heater with rapid bubble volume inflation, and the action force due to this rapid volume increment ejects a liquid droplet from the nozzles arranged at the tip of the recording head to make the droplet fly to the recording material and attach thereon. Printing is thus carried out.

In this method, however, the heater in the recording head is repeatedly heated to eject ink during mass printing. This may cause the deposition of the decomposition product of the ink, the so-called kogation, on the surface of the heater. Deposition of koga prevents the efficient transmission of the thermal energy from the heater to the ink, resulting in the decrease in the volume and speed of the ejected droplets in comparison with the initial stage, which affects the image quality. In such a case, the recording head must be changed with a new one in order to continuously achieve high quality printing. To the users, this means a higher printing cost in total.

Thus, reduction of kogation on the heater in order to prolong the recording head life has been one of the important technical problems to be improved in the art of bubble-jet method. There has been proposed, for example, ink containing an oxoanion (Japanese Patent Application Laid-Open No. 3-160070), where as an oxoanion, described are phosphate salts, polyphosphates, phosphoric esters, arsenates, molybdates, sulfates, sulfites and oxalates.

However, when the ejection of such an ink is repeated, the above oxoanions in the ink may dissolve the outermost protection layer of the heater made of a metal such as tantlum and/or a metal oxide to cause wire breakage in the heater. In addition, such an ink is still insufficient in kogation prevention.

SUMMARY OF THE INVENTION

An object of the present invention is to provide an ink and a method for decreasing kogation on the surface of the heater which is used for applying thermal energy to the ink in a recording head so as to eject the above ink from the recording head.

Another object of the present invention is to provide an ink-jet recording method and ink-jet recording apparatus, which enables high quality printing and prolonged product life of the recording head.

A further object of the present invention is to provide a recording unit which enables high quality printing over a prolonged period.

Still another object of the present invention is to provide a method for prolonging the product life of the recording head to lower the cost in high quality printing.

According to one aspect of the present invention, there is provided an ink comprising:

(a) a coloring material, (b) a liquid medium, (c) a compound selected from the group consisting of polyphosphoric acid, dicarboxylic acid, polyaminocarboxylic acid, aldonic acid, hydroxycarboxylic acid, polyolphosphate and salts thereof, and (d) an acid having an amino group and/or a salt thereof.

According to another aspect of the present invention, there is provided a method for reducing kogation on a surface of a heater of a recording head of an ink-jet printer, the heater being arranged to apply thermal energy to an ink in the recording head to eject the ink from an orifice in the recording head, and the heater having an outermost protection layer containing at least one of a metal and a metal oxide, the method comprising a step of using an ink as described above.

When an ink of the above composition and an ink jet printer of the above constitution are used for image formation, such an arrangement enables kogation reduction very effectively without dissolving the outermost surface of the heater which applies thermal energy for the ink ejection.

Although the reason why the use of this ink brings about good results is not clearly known, the inventors have confirmed that the combination use of the components (c) and (d) can reduce the kogation more than the single use of the component (c) or (d) does, elongating the head life. Thus, the components (c) and (d) seem to work synergetically in the ink. According to further study by the inventors, it is considered that the component (c) prevents kogation, or enhance koga decomposition or peeling off from the heater surface, and the component (d) functions in enhancing the head life by preventing the metal and/or metal oxide constituting the outermost protection surface of the heater from dissolving. Such an effect of the component (d) is especially remarkable with an ink containing an acid having a sulfonic group in addition to an amino group as the component (d), which satisfies both the kogation prevention effect and head life elongation effect at a very high level.

When the metal or the metal oxide contained in the outermost protection layer of the heater is tantalum or the oxide thereof, the effect is more remarkable. Further, effect of the present invention in preventing kogation will become more prominent, if the amount of the energy applied to the above heater is set so that Eop satisfies the relation in the following equation:

$$1.10 \leq Eop/Eth \leq 1.90$$

wherein Eop denotes the amount of the energy applied to the above heater and Eth denotes the minimum energy required for ink ejection.

According to another aspect of the present invention, there is provided an ink-jet recording method which comprises a step of applying thermal energy to a heater to eject an ink from an orifice, wherein the ink is an ink as described above.

According to further aspect of the present invention, there is provided an ink-jet recording apparatus which comprises an ink container containing an ink, an ink jet-recording head having a heater to supply thermal energy to the ink in an ink flow path supplied from the ink container, and means for applying a pulse electric signal to the heater according to recorded information, wherein the heater has an outermost surface-protecting layer containing at least one of a metal and a metal oxide, and the ink is an ink as described above.

According to still another aspect of the present invention, there is provided a recording unit which comprises an ink container, and an ink jet-recording head having a heater to supply thermal energy to the ink in an ink flow path supplied from the ink container, wherein the heater has an outermost surface-protecting layer containing at least one of a metal and a metal oxide, and the ink is an ink as described above.

According to still another aspect of the present invention, there is provided a method for prolonging a life of a recording head equipped with a heater, the recording head being used in an ink-jet recording method comprising a step of ejecting ink through an opening by applying thermal energy to the ink, wherein the heater is provided with an outermost protection layer containing at least a metal or oxide thereof and the ink is an ink as described above.

DETAILED DESCRIPTION OF THE PREFERRED EMBODIMENTS

Figure 1:
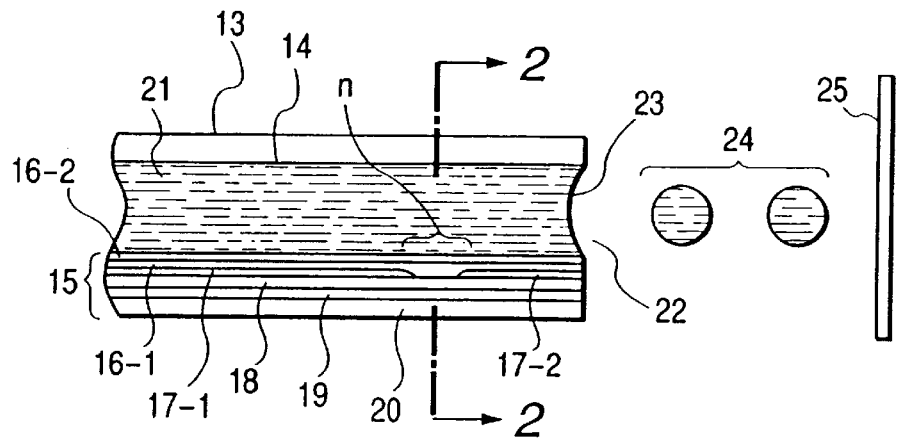
FIG. 1 is a vertical sectional view of one example head of an ink-jet recording apparatus.

The present invention will be described in further detail with reference to the preferred embodiments.

First, the inks of the present invention are described. Such an ink comprises (a) a coloring material, (b) a liquid medium, and (c) at least one compound selected from the group consisting of polyphosphoric acid, a dicarboxylic acid, a polyaminocarboxylic acid, an aldonic acid, a hydroxycarboxylic acid, polyol phosphate, and salts thereof, and (d) an acid having an amino group or a salt thereof or both.

The inventors of the present invention have been studying a method for decreasing kogation on the surface of a heater provided in an ink-jet recording head for the ink-jet recording in which ink is ejected as an ink droplet by the action of thermal energy, and found that such kogation is very effectively reduced by using an ink containing the both above (c) and (d) components. Use of such an ink would not dissolve the metal or metal oxide constituting the outermost protection layer of the heater, thus prolonging the life of the recording head. This finding led to the present invention. Next, each component of the ink of the present invention is described.

Component (c)

First, the component (c) which characterizes the ink of the present invention is described.

The component c includes organic acids such as carboxylic acids and sulfonic acid, phenols, and polyol phosphate, among which, organic acids having hydroxy group, specifically hydroxy carboxylic acids, are preferable.

More specifically, polyphosphoric acids such as pyrophosphoric acid, tripolyphosphoric acid, and hexametaphosphoric acid; dicarboxylic acids such as oxalic acid, malonic acid, succinic acid, and glutaric acid; polyaminocarboxylic acid such as ethylenediaminetetraacetic acid, iminodiacetic acid, and nitrilotriacetic acid; aldonic acids such as glycolic acid, glyceric acid, gluconic acid, galactonic acid, and glucoheptonic acid; hydroxycarboxylic acids (oxycarboxylic acids) such as citric acid, malic acid, lactic acid, glycolic acid, glyceric acid, mandelic acid, and tartaric acid; and polyol phosphate such as α-glycerophosphoric acid, and β-glycerophosphoric acid.

Specifically, a hydroxycarboxylic acid such as citric acid, gluconic acid (in form of δ-gluconolactone and γ-gluconolactone in solid), malic acid, lactic acid, glycolic acid, and tartaric acid; and polyol phosphate such as α-glycerophosphoric acid, and β-glycerophosphoric acid. More specifically, citric acid and gluconic acid are preferable. The (c) component may be used in an acid form or alkaline form. Specifically, it may be used as a form of alkali metal salt, ammonium salt, an salt of an organic amine such as triethanolamine, monoethanolamine, and triisopropanolamine.

When a salt is used as the component (c), one can use a commercially available salt, or can prepare a salt of an organic acid by addition of an alkali agent. Such an alkali agent includes, for example, lithium hydroxide, sodium hydroxide, potassium hydroxide, ammonia water (ammonium hydroxide), organic amines such as triethanolamine, diethanolamine, monoethanolamine, diisopropanolamine, triisopropanolamine, tetramethylammonium hydroxide, tetraethylammonium hydroxide, and tetra-n-propylammonium hydroxide. Specifically preferable for an organic acid is an ammonium salt.

The above-described component (c) can be used singly, or in combination of two or more. The total content of the component (c) is 0.005 to 20 wt % of the total ink weight, preferably, 0.05 to 12 wt % of the total amount of the ink. Use of the component (c) in this range in combination with the component (d) can give an ink excellent in reduction of kogation and applicability for ink-jet printing such as little recording head clogging.

Component (d)

Next, the component (d) constituting the ink of the present invention with the component (c) is described.

The component (d) includes acids having an amino group such as amidosulfuric acid (sulfamic acid), aminomethanesulfonic acid, taurine(2-aminoethane sulfonic acid), carbamic acid, glycine, alanine, aspartic acid, glutamic acid, phenylalanine, leucine, isoleucine, threonine, tryptophan, valine, methionine, and lysine. Specifically preferable are sulfamic acid, aminomethanesulfonic acid and taurine, more specifically taurine.

When a salt is used as the component (d), one can use the commercially available salt, or can prepare a salt of an organic acid by addition of an alkali agent. Such an alkali agent includes, for example, lithium hydroxide, sodium hydroxide, potassium hydroxide, ammonia water (ammonium hydroxide), organic amines such as triethanolamine, diethanolamine, monoethanolamine, diisopropanolamine, triisopropanolamine, tetramethylammonium hydroxide, tetraethylammonium hydroxide, and tetra-n-propylammonium hydroxide. Specifically preferable is to use the ammonium salt of an organic acid having an amino group.

The above-described component (d) can be used singly, or in combination of two or more. The total content of the component (d) is 0.005 to 20 wt % of the total ink weight, preferably, 0.05 to 12 wt % of the total amount of the ink. Use of the component (d) in this range in combination with the component (d) can give an ink excellent in reduction of kogation and applicability for ink-jet printing such as little recording head clogging.

The ink of the present invention preferably contains the components (c) and (d) in a weight ratio of 20:1 to 1:20. Within such a component ratio, the ink can sufficiently reduce the kogation on the heater and effectively inhibit the damage of the outermost protection layer of the heater.

Next, the component (a) of the ink of the present invention is described.

(a) Coloring Material

As a coloring material, dyes or pigments are preferably used.

Dyes

The dyes applicable to the invention include any kinds of dyes, such as direct dyes, acid dyes, basic dyes and disperse dyes. Specifically, following dyes can be used alone or in combination, not limiting to them.

C.I. DIRECT BLACK -4, -9, -11, -17, -19, -22, -32, -80, -151, -154, -168, -171, -194, -195,

C.I. DIRECT BLUE -1, -2, -6, -8, -22, -34, -70, -71, -76, -78, -86, -142, -199, -200, -201, -202, -203, -207, -218, -236, -287,

C.I. DIRECT RED -1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, -225, -227,

C.I. DIRECT YELLOW -1, -2, -4, -8, -11, -12, -26, -27, -28, -33, -34, -41, -44, -48, -86, -87, -88, -132, -135, -142, -144,

C.I. FOOD BLACK -1, -2,

C.I. ACID BLACK -1, -2, -7, -16, -24, -26, -28, -31, -48, -52, -63, -107, -112, -118, -119, -121, -172, -194, -208,

C.I. ACID BLUE -1, -7, -9, -15, -22, -23, -27, -29, -40, -43, -55, -59, -62, -78, -80, -81, -90, -102, -104, -111, -185, -254,

C.I. ACID RED -1, -4, -8, -13, -14, -15, -18, -21, -26, -35, -37, -52, -249, -257, -289,

C.I. ACID YELLOW -1, -3, -4, -7, -11, -12, -13, -14, -19, -23, -25, -34, -38, -41, -42, -44, -53, -55, -61, -71, -76, -79,

C.I. REACTIVE BLUE -1, -2, -3, -4, -5, -7, -8, -9, -13, -14, -15, -17, -18, -19, -20, -21, -25, -26, -27, -28, -29, -31, -32, -33, -34, -37, -38, -39, -40, -41, -43, -44, -46,

C.I. REACTIVE RED -1, -2, -3, -4, -5, -6, -7, -8, -11, -12, -13, -15, -16, -17, -19, -20, -21, -22, -23, -24, -28, -29, -31, -32, -33, -34, -35, -36, -37, -38, -39, -40, -41, -42, -43, -45, -46, -49, -50, -58, -59, -63, -64, -180

C.I. REACTIVE YELLOW -1, -2, -3, -4, -6, -7, -11, -12, -13, -14, -15, -16, -17, -18, -22, -23, -24, -25, -26, -27, -37, -42,

C.I. REACTIVE BLACK -1, -3, -4, -5, -6, -8, -9, -10, -12, -13, -14, -18,

PROJET FAST CYAN 2 (available from Zeneca), PROJET FAST MAGENTA 2 (Zeneca), PROJET FAST YELLOW 2 (Zeneca), PROJET FAST BLACK 2 (Zeneca), etc.

Pigment

Pigments applicable to the present invention include any kinds of pigments, such as inorganic pigments and organic pigments.

In particular, the applicable pigments are as follows, but not limited to them.

CARBON BLACK

C.I. PIGMENT YELLOW -1, -2, -3, -12, -13, -14, -16, -17, -73, -74, -75, -83, -93, -95, -97, -98, -114, -128, -129, -151, -154, -195,

C.I. PIGMENT RED -5, -7, -12, -48 (Ca), -48 (Mn), -57 (Ca), -57:1, 57 (Sr), 112, 122, 123, 168, 184, 202,

C.I. PIGMENT BLUE -1, -2, -3, -15:3, -15:34, -16, -22, -60,

C.I. VAT BLUE -4, -6, etc.

Dispersant

When the above pigments are used, it is preferable to use a dispersant to stably disperse the pigments in ink. The dispersants applicable to the present invention include polymer dispersants and surfactant-based dispersants. Specific examples of polymeric dispersants are salts of polyacrylate, salts of styrene-acrylic acid copolymer, salts of styrene-methacrylic acid copolymer, salts of styrene-acrylic acid-acrylic ester copolymer, salts of styrene-maleic acid copolymer, salts of acrylic ester-maleic acid copolymer, salts of styrene-methacrylicsulfonic acid copolymer, salts of vinylnaphthalene-maleic acid copolymer, salts of β-naphthalenesulfonic acid formalin condensation product, poly(vinylpyrrolidone), polyethylene glycol and poly(vinyl alcohol). Preferably the weight average molecular weight of the polymeric dispersants is in the range of 1000 to 30000, and the acid value of the same is in the range of 100 to 430. Examples of surfactant-based dispersants include laurylbenzene sulfonate, lauryl sulfonate, laurylbenzene-carboxylate, laurylnaphthalene sulfonate, salts of aliphatic amine, and poly(ethylene oxide) condensation product. The amount of the dispersants used is preferably in the range of pigment weight : dispersant weight of 10:5 to 10:0.5.

Self-dispersing Carbon Black

Also applicable are carbon black which have been made self-dispersing by introducing water-soluble groups onto the surface as described in Japanese Patent Application Laid-Open No. 5-186704 and Japanese Patent Application Laid-Open No. 8-3498. When using such a self-dispersing type carbon black, a dispersant is not necessary.

These dyes and pigments may be used alone or in combination. Generally, the content of these dyes and pigments is properly selected from the range of 0.1 to 20 wt % of the total ink weight.

(b) Liquid Media

Now the liquid medium used in the present invention is described. As a liquid medium, preferably a water-containing medium, especially mixed media of water and water-soluble solvents are used. Preferably, water used in the present invention is deionized water, not ordinary water which contains various ions. The water content is preferably in the range of 35 to 96 wt % of the total amount of the aqueous pigment ink. Water-soluble organic solvents are used to adjust the ink viscosity, to slow down the ink drying rate and to enhance the solubility of coloring materials in ink so as to prevent clogging of the nozzles of recording head.

The above solvent is exemplified by alkyl alcohols of 1 to 5 carbons such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or keto alcohols such as acetone, diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols having an alkylene group of 2 to 6 carbons, such as ethylene glycol, propylene glycol, trimethylene glycol, triethylene glycol, 1,2,6 -hexantriol; glycerol; trimethylolethane, trimethylolpropane; lower alkyl ethers such as ethylene glycol monomethyl(or monoethyl) ether and diethylene glycol monomethyl(or monoethyl) ether; lower dialkyl ethers of polyhydric alcohol, such as triethylene glycol dimethyl (or diethyl) ether and tetraethylene glycol dimethyl (or diethyl) ether; alkanolamines such as monoethanolamine, diethanolamine and triethanolamine; sulfolane, N-methyl-2-pyrrolidone, 2-pyrrolidone, and 1,3-dimethyl-2-imidazolydinone. The above water-soluble organic solvents can be used individually or as a mixture of two or more solvents.

Additives

The ink of the present invention may properly contain various additives such as adjusting agents, pH adjusting agents, antimolds, preservatives, antioxidants, defoaming agents, surfactants and humectants such as urea for preventing nozzle from drying.

Physical Properties of Ink

Physical properties of the ink according to the present invention are: pH is preferably in the range of 3 to 12, more preferably 4 to 10 at around 25° C.; surface tension is preferably in the range of 10 to 60 dyn/cm, more preferably 15 to 50 dyn/cm; and viscosity is preferably in the range of 1 to 30 cps, more preferably 1 to 10 cps.

Ink-jet Recording Method and Apparatus

The method suitable for recording with the ink of the present invention is the ink-jet recording method in which ink droplets are formed by the thermal energy applied to the ink according to recording signals in the recording head. A recording apparatus in which the ink of the present invention described above is used is described with reference to the drawings.

Figure 2:
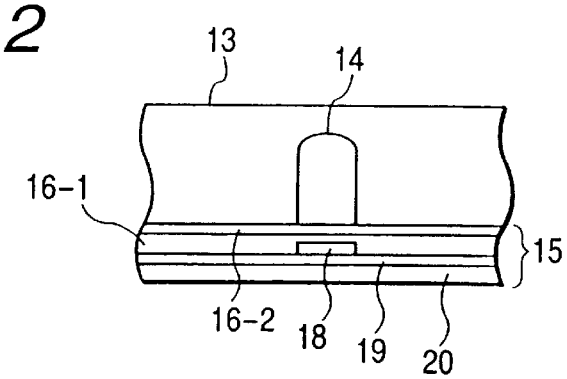
FIG. 2 is a horizontal sectional view of one example head of an ink-jet recording apparatus.

FIGS. 1 and 2 show an example of constitution of the main part of an ink-jet recording apparatus which utilizes thermal energy. FIG. 1 is a sectional view of a head 13 taken along the ink flow path, and FIG. 2 is a sectional view taken along line 2—2 of FIG. 1. The head 13 is prepared by gluing a substrate with a heat generating element 15 to a board of glass, ceramic, silicon, polysulfone or plastic board on which a flow path (nozzle) 14 for ink is provided. The substrate with a heat generating element 15 comprises a protection layer 16-1 made of silicon oxide, silicon nitride or silicon carbide, an outermost protection layer 16-2 made of a metal such as platinum or metal oxide thereof, preferably made of tantalum or oxide of tantalum, electrodes 17-1 and 17-2 made of aluminum, gold or aluminum-copper alloy, a heat generating resistor layer 18 made of a high melting point material such as hafnium boride, tantalum nitride or aluminum tantalate, a heat accumulation layer 19 made of silicon oxide or aluminum oxide, and a substrate 20 made of a heat-radiative material such as silicon, aluminum or aluminum nitride.

Figure 3:
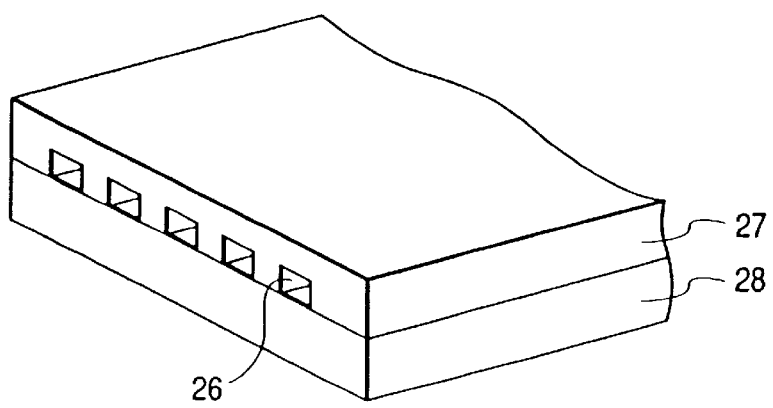
FIG. 3 shows an external appearance in perspective of a head having several nozzles like that shown in FIG. 1.

When electric pulse signals are applied to the electrodes 17-1 and 17-2 of the above head 13, the region designated with n (heater) of the heat generating substrate 15 rapidly generates heat, thereby a bubble is formed in the ink 21 in contact with the above region. Due to the pressure of the bubble, the meniscus 23 protrudes to eject the ink 21 through the nozzle 14 of the head, and the ink ejected from an discharge orifice 22 as a droplet flies toward and lands on a recording medium 25. FIG. 3 shows an outer view of one example of the multi-head type recording head in which the heads shown in FIG. 1 are lined up in an integral unit. This multi-head type recording head is prepared by gluing a glass plate 27 having multi-nozzle 26 and a heat generating head 28 as described in FIG. 1.

Amount of Energy applied to Heater

Value r is a factor which represents the ratio of the energy actually applied to the heater and the critical energy with which the bubble jet head can eject ink. When the width of the pulse applied to the bubble jet head is denoted by P (when multiple pulses are applied separately, the sum of each pulse width is denoted by P), the voltage applied to the head is denoted by V and the resistance of the heater is denoted by R, then the energy E applied to the heater can be expressed by the following equation:

$$E = P \times V^2 / R \quad \text{(A)}$$

When the lowest energy with which the bubble jet head can eject ink is denoted by Eth and the energy actually applied to the heater is denoted by Eop, then the value r is obtained from the following equation:

$$r = Eop/Eth \quad \text{(B)}$$

To determine r from the operation conditions of the bubble jet head, there are, for example, two methods shown below.

Method 1. Fixed Pulse Width

The bubble jet head is operated at a given pulse width and at a proper voltage at which the above head can eject ink. Then the voltage is lowered slowly so as to find a voltage at which ejection stops. Threshold voltage is a voltage immediately before the voltage at which ejection stopped and denoted by Vth. If the voltage actually used to operate the head is denoted by Vop, then the value r is obtained from the following equation (C):

$$r = (Vop/Vth)^2 \quad \text{(C)}$$

Method 2. Fixed Voltage

The bubble jet head is driven at a given voltage with a proper pulse width at which the above head can eject ink. Then the pulse width is decreased slowly so as to find a pulse width at which ejection stops. Let Pth denote the minimum pulse width just before the found pulse width. If the pulse width actually used to drive the head is denoted by Pop, then a value r is obtained from the following equation (D):

$$r = Pop/Pth$$

The above voltage means the voltage actually applied to the BJ heater to generate heat. The voltage applied from the outside of the head may decrease due to the contacts, wiring resistance, etc.; however, when Vth and Vop are measured from the outside of the head, both measurements include the voltage fluctuation. Accordingly, unless the fluctuations are considerably large, the value r calculated directly using the measured values may be used without serious error.

It should be noted that, when carrying out recording by an actual printer, multiple heaters are driven at the same time, which can cause the voltage fluctuation applied to one heater.

From the above equations (A) and (B), it appears that $V^2$ is inversely proportional to P when r is constant. However, actually, the relationship between $V^2$ and P is not so simple, since there are various problems intertwined with each other: an electrical problem that the pulse shape does not become rectangular, a thermal problem that the thermal diffusion in the vicinity of heater differs with the shape of pulse, and a problem peculiar to the bubble jet head that the thermal flow from heater to the ink varies with the voltage to change the bubbling state. Accordingly, Method 1 and Method 2 described above should be treated independently. It is noted that errors may arise if the value obtained from one method is converted to that of the other method by calculation. Unless otherwise specified, the value r obtained by Method 1 is used in the present invention.

Generally, the head is driven at an r value of about 1.12 to 1.96 to eject ink in a stable manner. However, when the ink of the present invention is used to be ejected from a recording head by applying thermal energy thereto, the head is preferably driven at an r value in the pre-determined range, that is, in the range of 1.10 to 1.75. This enables the prevention of kogation on the heater and thereby elongation of the recording head life.

The reason why kogation is effectively prevented and head life is elongated when the r value is in the above range, but the inventors consider as follows. When operation is carried out in the above r value range, the component (d) in the ink protects the outermost layer of the heater and prevents the surface metal and/or metal oxide constituent from corrosion, and as the temperature will not become too high because the excessive energy is not supplied thereto, thus the excessive corrosion of the metal by the component (c) is prevented.

Figure 4:
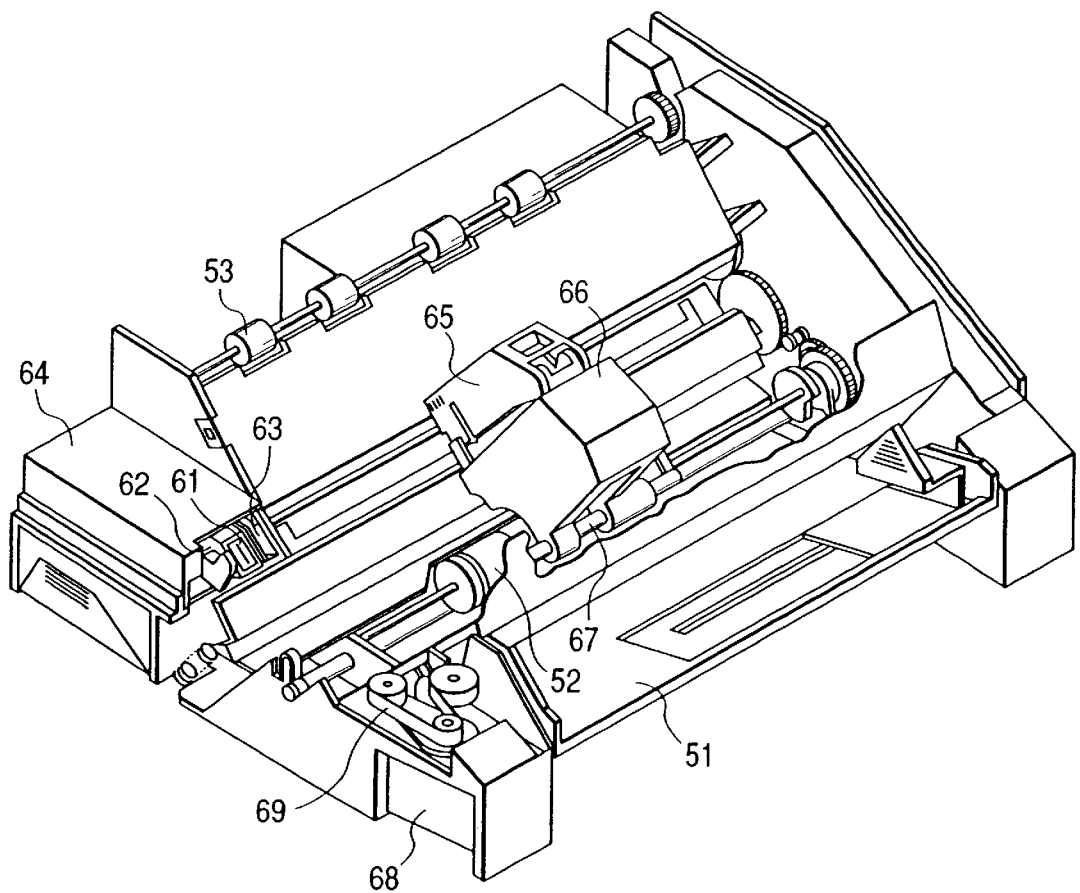
FIG. 4 is a schematic view in perspective of one example ink-jet recording apparatus.

FIG. 4 shows one example of the ink-jet recording apparatus in which such a head is incorporated. In FIG. 4, reference numeral 61 designates a blade as a wiping member which is supported with and fixed to a blade-supporting member at one end and has a cantilever-like shape. The blade 61 is arranged in a position adjacent to the recording region of a recording head 65. In this example, the blade is held in a projecting form in the path along which the recording head 65 moves.

Reference numeral 62 denotes a cap for a ejection opening of the recording head 65, the cap is arranged in a home position adjacent to the blade 61 and to move in the direction perpendicular to the moving direction of the recording head 65 so as to cap the ink-ejecting opening when touching it. Numeral 63 designates an ink-absorber provided adjacent to the blade 61, which is held in the moving path of the recording head 65 in a projecting form like the blade 61. The above blade 61, cap 62 and ink-absorber 63 constitute an ejection recovery portion 64, and the blade 61 and the ink-absorber 63 serve to remove moisture and dust on the ink-ejecting opening.

Reference numeral 65 designates a recording head. The head contains means for generating ink-ejecting energy and performs recording by ejecting ink towards a recording medium opposite to the ink-ejecting opening. Numeral 66 designates a carriage for carrying the recording head 65 so that it can move. The carriage 66 is engaged with a guide shaft 67 in a slidable manner, and a part of the carriage 66 is connected to a belt 69 (not shown in the figure) driven by a motor 68. Thus the carriage 66 can move along the guide shaft 67, and the recording head 65 can move in the recording region and the region adjacent thereto.

Reference numeral 51 designates a paper feeding portion for inserting a recording medium and numeral 52 designates a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds. In the above arrangement, while the recording head returns to its home position after recording, the cap 62 of the ejection recovery portion 64 evacuates from the moving path of the recording head, but the blade 61 is projecting in the moving path. As a result, the ink ejecting opening of the recording head 65 is wiped.

The cap 62 moves into the moving path of the recording head 65 in a projecting manner to touch the ejection opening of the head 65 for capping. While the recording head 65 is moving from its home position to recording start position, the cap 62 and the blade 61 take the same position as when wiping is carried out. As a result, the ejecting opening of the head 65 is wiped even during this movement. The recording head not only returns to its home position not only after completion of recording and during ejection recovery, but also returns to the home position adjacent to the recording region during moving in the recording region for recording, at prescribed intervals. With this movement, the above wiping is also carried out.

Figure 5:
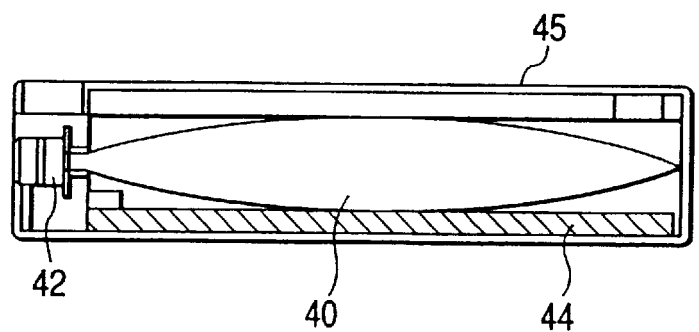
FIG. 5 is a vertical sectional view of one example ink cartridge to show the internal configuration.

FIG. 5 shows one example of an ink cartridge for storing ink for feeding ink to the recording head through an ink feeding member, such as tube. In the drawing, reference numeral 40 denotes a member constituting the ink cartridge 45, an ink storage portion such as ink bag, whose tip is equipped with a rubber stopper 42. The ink in the ink bag 40 can be fed to the recording head by inserting a needle (not shown in the figure) into the stopper 42. Numeral 44 designate an ink absorber for receiving waste ink. For the ink storage portion, its surface in contact with ink is preferably made of polyolefin, particularly polyethylene.

Figure 6:
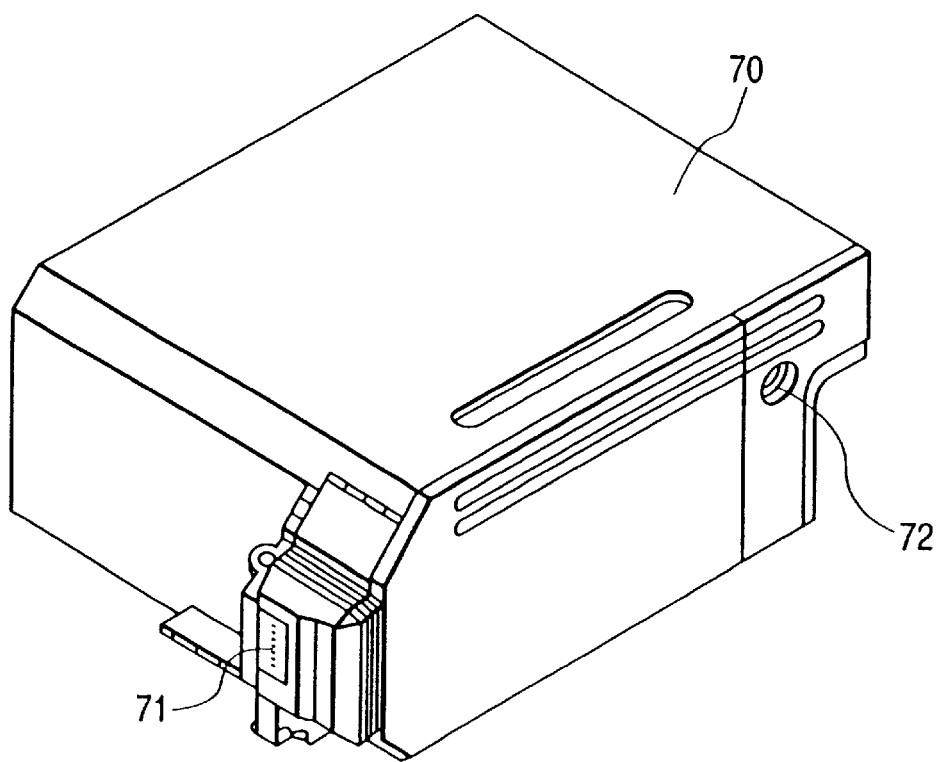
FIG. 6 is a perspective view of one example recording unit.

The ink-jet recording apparatus for use in the present invention is not limited to the aforementioned type in which an ink cartridge is not furnished as an integral part of the head, as shown in FIG. 6. The type in which the above two are integrated into one part is also preferably used. In FIG. 6, reference numeral 70 designates a recording unit which contains an ink storage portion for storing ink, for example, an ink absorber. In the arrangement of the above unit, ink in the ink absorber is ejected as an ink droplet from a head portion 71 having multiple orifices in it. As a material for the ink absorber, polyurethane is preferably used in the present invention. An integral constitution in which no ink absorber is used and the ink storage portion is an ink bag having a spring within it may be used. Numeral 72 designates an opening for connecting the inside of the cartridge with air.

This recording unit 70 is used in place of the recording head 65 shown in FIG. 4 and detachably attached to the carriage 66.

EXAMPLES

The present invention is explained in more detail with reference to the following examples and comparative examples. These examples are intended to illustrate the invention and are not construed to limit the scope of the invention. Unless otherwise stated, "parts" and "%" are expressed by weight.

Examples 1 to 4

First, the following components were mixed, well-stirred and dissolved, then subjected to pressure filtration with a microfilter of 0.2 µm in pore size (from Fuji Photo Film Co., Ltd.) to prepare the ink of Example 1.

Ink Composition of Example 1

| | |
|---|---|
| PROJET FAST BLACK 2 (available from Zeneca) | 2 parts |
| diethylene glycol | 10 parts |
| triammonium citrate | 2 parts |
| taurine | 2 parts |
| sodium hydroxide | 0.2 parts |
| water | 83.8 parts |

Evaluation 1

Vth (threshold voltage for ejecting ink) was measured at pulse widths of 1.1 µs (on)+3.0 µs (off)+3.2 µs (on) and an operation frequency of 6250 Hz, using the ink of Example 1 described above and an ink-jet recording apparatus having an on-demand type multiple recording head (BC-02, from Canon Inc.) where the outermost protection layer on the heater consists of tantalum and oxide thereof and the ink is ejected by applied thermal energy according to recording signals. Then ejection durability and kogation were evaluated according to the following methods and criteria. Vop (operation voltage) was calculated from the following equation:

$$Vop = \sqrt{r} \times Vth$$

where r=1.39 in Example 1. The result is shown in Table 1.

In Examples 2 to 4, estimation was carried out at Vop values corresponding to r=1.10 (Example 2), r=1.49 (Example 3), and r=1.72 (Example 4). In these examples, ink of Example 1 was used. The result is shown in Table 1.

Ejection Durability

In Examples 1 to 4, continuous ejection was performed by using the above apparatus and operation conditions. The ink droplets of $1 \times 10^6$ shots, ejected from the recording head, were collected in a container and weighed with the container by an electronic balance. The average ink droplet weight during $1 \times 10^6$ shots was calculated from the weight increase. The continuous ejection was performed for a total of $1 \times 10^8$ shots. The evaluation criteria were categorized as follows:

A: The average weight of the ink droplets ejected during $9.9 \times 10^7$ to $1 \times 10^8$ shots is 90% or more of that during 0 to $1 \times 10^6$ shots.
B: The average weight of the ink droplets ejected during $9.9 \times 10^7$ to $1 \times 10^8$ shots is from 70% and less than 90% of that during 0 to $1 \times 10^6$ shots.
C: The average weight of the ink droplets ejected during $9.9 \times 10^7$ to $1 \times 10^8$ shots is less than 70% of that during 0 to $1 \times 10^6$ shots.
D: Ejection stopped before $1 \times 10^8$ shots.

The result is shown in Table 1. Inks of the evaluation score not lower than B are judged to be practically usable.

(2) Amount of Koga

The recording head having been subjected to the above ejection durability evaluation was disassembled, and the surface of the heater in the nozzle was observed under an optical microscope (X400 magnifications). The amount of koga was evaluated using the following criteria:

A: Little koga was observed;
B: A little koga was observed;
C: Certain amount of koga was observed;
D: Large amount of koga was observed.

Examples 5 to 13

The components shown below were mixed, fully stirred and dissolved, then subjected to pressure filtration with a microfilter of 0.2 µm pore size (from Fuji Photo Film Co., Ltd.), to prepare ink for use in Examples 5 to 13. Using these inks, evaluation was carried out in the same manner as in Example 4. The results are shown in Table 1.

Ink Composition of Example 5

| | |
|---|---|
| PROJET FAST BLACK 2 (available from Zeneca) | 2 parts |
| diethylene glycol | 10 parts |
| triammonium citrate | 2 parts |
| sulfamic acid | 2 parts |
| sodium hydroxide | 0.2 parts |
| water | 83.8 parts |

Ink Composition of Example 6

| | |
|---|---|
| PROJET FAST BLACK 2 (available from Zeneca) | 2 parts |
| diethylene glycol | 10 parts |
| triammonium citrate | 2 parts |
| aminomethanesulfonic acid | 2 parts |
| sodium hydroxide | 0.2 parts |
| water | 83.8 parts |

Ink Composition of Example 7

| | |
|---|---|
| PROJET FAST BLACK 2 (available from Zeneca) | 2 parts |
| diethylene glycol | 10 parts |
| succinic acid | 2 parts |
| taurine | 1 part |
| sodium hydroxide | 1 part |
| water | 84 parts |

Ink Composition of Example 8

| | |
|---|---|
| PROJET FAST BLACK 2 (available from Zeneca) | 2 parts |
| diethylene glycol | 10 parts |
| diammonium citrate | 2 parts |
| L-glutamic acid | 3 parts |

-continued

| | |
|---|---|
| lithium hydroxide | 0.1 parts |
| water | 82.9 parts |

Ink Composition of Example 9

| | |
|---|---|
| PROJET FAST BLACK 2 (available from Zeneca) | 2 parts |
| diethylene glycol | 10 parts |
| diammonium citrate | 2 parts |
| L-aspartic acid | 3 parts |
| lithium hydroxide | 0.1 parts |
| water | 82.9 parts |

Ink Composition of Example 10

| | |
|---|---|
| PROJET FAST BLACK 2 (available from Zeneca) | 2 parts |
| diethylene glycol | 10 parts |
| 2-propanol | 4 parts |
| sodium gluconate | 2 parts |
| taurine | 2 parts |
| ammonia water 28% | 0.3 parts |
| water | 79.7 parts |

Ink Composition of Example 11

| | |
|---|---|
| PROJET FAST BLACK 2 (available from Zeneca) | 2 parts |
| diethylene glycol | 10 parts |
| diphosphoric acid | 2 parts |
| taurine | 3 parts |
| sodium hydroxide | 0.2 parts |
| ammonia water 28% | 1 part |
| water | 81.8 parts |

Ink Composition of Example 12

| | |
|---|---|
| PROJET FAST BLACK 2 (available from Zeneca) | 2 parts |
| diethylene glycol | 10 parts |
| disodium β-glycerophosphate (5 hydrate) | 2 parts |
| taurine | 3 parts |
| ammonia water 28% | 0.3 part |
| water | 82.7 parts |

Comparative Examples 1 to 5

The components shown below were mixed, fully stirred and dissolved, then subjected to pressure filtration with a microfilter of 0.2 μm pore size (from Fuji Photo Film Co., Ltd.), to prepare ink for use in Comparative Examples 1 to 9. Using these inks, evaluation was carried out in the same manner as in Examples 1 to 4 at a Vop corresponding to r=1.72. The results are shown in Table 2.

Ink composition of Comparative Example 1

| | |
|---|---|
| PROJET FAST BLACK 2 (available from Zeneca) | 2 parts |
| diethylene glycol | 10 parts |
| 2-propanol | 4 parts |
| ammonia water 28% | 0.3 part |
| water | 83.7 parts |

Ink composition of Comparative Example 2

| | |
|---|---|
| PROJET FAST BLACK 2 (available from Zeneca) | 2 parts |
| diethylene glycol | 10 parts |
| sodium hydroxide | 0.2 part |
| water | 87.8 parts |

Ink composition of Comparative Example 3

| | |
|---|---|
| PROJET FAST BLACK 2 (available from Zeneca) | 2 parts |
| diethylene glycol | 10 parts |
| lithium hydroxide | 0.1 parts |
| water | 87.9 parts |

Ink composition of Comparative Example 4

| | |
|---|---|
| PROJET FAST BLACK 2 (available from Zeneca) | 3 parts |
| glycerol | 8 parts |
| diethylene glycol | 5 parts |
| urea | 5 parts |
| N,N-bis(2-hydroxyethyl)glycine | 1.5 parts |
| sodium hydroxide | 0.25 parts |
| water | 77.25 parts |

Ink composition of Comparative Example 5

| | |
|---|---|
| PROJET FAST BLACK 2 (available from Zeneca) | 3 parts |
| glycerol | 10 parts |
| urea | 8 parts |
| N,N-bis(2-hydroxyethyl)aminoethanesulfonic acid | 2.5 parts |
| sodium hydroxide | 0.5 parts |
| water | 76 parts |

Examples 13 to 30 and Comparative Examples 6 to 14

The components shown below were mixed, fully stirred and dissolved, then subjected to pressure filtration with a microfilter of 0.2 μm pore size (from Fuji Photo Film Co., Ltd.), to prepare ink for use in Examples 13 to 30 and Comparative Examples 6 to 14. Further, pigment inks of Examples 26 to 30 were prepared by using a pigment dispersant made from the components shown below.

Ink Composition of Example 13

| | |
|---|---|
| PROJET FAST BLACK 2 (available from Zeneca) | 2 parts |
| diethylene glycol | 10 parts |
| DL-malic acid | 2 parts |
| sulfamic acid | 1 part |
| sodium hydroxide | 0.6 parts |
| ammonia water 28% | 0.6 parts |
| water | 83.8 parts |

Ink Composition of Example 14

| | |
|---|---|
| PROJET FAST BLACK 2 (available from Zeneca) | 2 parts |
| diethylene glycol | 10 parts |
| sodium tartarate (dihydrate) | 2 parts |
| aminomethanesulfamic acid | 1 part |
| ammonia water 28% | 0.5 parts |
| water | 84.5 parts |

Ink Composition of Example 15

| | |
|---|---|
| PROJET FAST BLACK 2 (available from Zeneca) | 2 parts |
| diethylene glycol | 10 parts |
| sodium lactate 50% aqueous solution | 5 parts |
| taurine | 0.5 parts |
| ammonia water 28% | 1 part |
| water | 81.5 parts |

Ink Composition of Example 16

| | |
|---|---|
| PROJET FAST BLACK 2 (available from Zeneca) | 2 parts |
| diethylene glycol | 10 parts |
| trisodium citrate (dihydrate) | 1.5 parts |
| taurine | 1 part |
| ammonia water 28% | 0.3 parts |
| water | 85.2 parts |

Ink Composition of Example 17

| | |
|---|---|
| PROJET FAST BLACK 2 (available from Zeneca) | 2 parts |
| diethylene glycol | 10 parts |
| sodium lactate 50% aquepis solution | 2 parts |
| L-glutamic acid | 2 parts |
| lithium hydroxide | 0.02 parts |
| water | 83.98 parts |

Ink Composition of Example 18

| | |
|---|---|
| PROJET FAST BLACK 2 (available from Zeneca) | 2 parts |
| diethylene glycol | 10 parts |
| disodium citrate | 2 parts |
| L-aspartic acid | 2 parts |
| lithium hydroxide | 0.02 parts |
| water | 83.98 parts |

Ink Composition of Example 19

| | |
|---|---|
| PROJET FAST BLACK 2 (available from Zeneca) | 2 parts |
| diethylene glycol | 10 parts |
| δ-gluconolactone | 2 parts |
| taurine | 1 part |
| ammonia water 28% | 1 part |
| water | 84 parts |

Ink Composition of Example 20

| | |
|---|---|
| PROJET FAST BLACK 2 (available from Zeneca) | 2 parts |
| diethylene glycol | 10 parts |
| disodium phosphate | 2 parts |
| taurine | 3 parts |
| ammonia water 28% | 1 part |
| water | 82 parts |

Ink Composition of Example 21

| | |
|---|---|
| PROJET FAST BLACK 2 (available from Zeneca) | 2 parts |
| diethylene glycol | 10 parts |
| β-glycerophosphoric acid disodium salt (5 hydrate) | 2 parts |
| taurine | 1 part |
| ammonia water 28% | 0.3 parts |
| water | 84.7 parts |

Ink Composition of Example 22

| | |
|---|---|
| PROJET FAST YELLOW 2 (available from Zeneca) | 3 parts |
| diethylene glycol | 10 parts |
| triammonium citrate | 2 parts |
| taurine | 1 part |
| sodium hydroxide | 0.2 parts |
| water | 83.8 parts |

Ink Composition of Example 23

| | |
|---|---|
| PROJET FAST MAGENTA 2 (available from Zeneca) | 3 parts |
| diethylene glycol | 10 parts |
| triammonium citrate | 2 parts |
| taurine | 1 part |
| lithium hydroxide | 0.2 parts |
| water | 83.8 parts |

Ink Composition of Example 24

| | |
|---|---|
| PROJET FAST CYAN 2 (available from Zeneca) | 4 parts |
| diethylene glycol | 10 parts |
| triammonium citrate | 2 parts |
| taurine | 1 part |
| sodium hydroxide | 0.2 parts |
| water | 82.8 parts |

Ink Composition of Example 25

| | |
|---|---|
| PROJET FAST BLACK 2 (available from Zeneca) | 2 parts |
| Glycerol | 5 parts |
| diethylene glycol | 5 parts |
| urea | 4 parts |
| 2-propanol | 3.5 parts |
| triammonium citrate | 2 parts |
| taurine | 1 part |
| sodium hydroxide | 0.1 parts |
| ammonium sulfate | 0.1 parts |
| water | 77.3 parts |

Ink preparation for Example 26

| <Preparation of Pigment dispersion 1> | |
|---|---|
| styrene - acrylic acid - butyl acrylate copolymer (acid value 116, average molecular weight 3700) | 5 parts |
| triethanolamine | 0.5 parts |
| diethylene glycol | 5 parts |
| water | 69.5 parts |

The above components were mixed and heated in a water bath to 70° C., so that the resin component was fully dissolved. Then carbon black "MA-100" (pH 3.5; available from Mitsubishi Chemical Industries Ltd.), 15 parts, and 2-propanol, 5 parts, were added to this solution. After premixing for 30 minutes, the solution was subjected to dispersing treatment under the following conditions:

Disperser: SAND GRINDER (Available from Igarashi Kikai Co., Ltd.)

Grinding Media: zirconium beads 1 mm in diameter

Grinding Media Charge: 50% (volume)

Grinding Time: 3 hours

Then the above solution was subjected to centrifugal dispersing treatment (12000 rpm, 20 minutes) to remove large-size particles. Thus obtained was the pigment dispersion 1.

Preparation of Ink

The components below were mixed in a beaker and stirred at 25° C. for 3 hours. Then the mixture was subjected to pressure filtration with a membrane filter of 3.0 μm pore size (available from Sumitomo Electric Industries, Ltd.). Thus obtained was the ink for Example 27.

| | |
|---|---|
| pigment dispersion 1 | 30 parts |
| diethylene glycol | 10 parts |
| 2-propanol | 2 parts |
| triammonium citrate | 1 part |
| tairine | 1 part |
| sodium hydroxide | 0.1 parts |
| water | 54.9 parts |

Ink preparation for Example 27

Preparation of Pigment dispersion 2

Into 1000 ml of water, 300 g of commercially available acid carbon black "MA77" (pH 3; available from Mitsubishi Chemical Corp.) was fully mixed, and then, 450 g of sodium hypochlorite (12% available chlorine concentration) was added dropwise to the solution, and the mixture was stirred at 100 to 105° C. for 10 hours. The slurry thus obtained was filtered with TOYO Filter Paper No. 2 (available from Advantest Corporation), and the pigment particles were fully washed with water. This wet pigment cake was dispersed again into 3000 ml of water and the dispersion was deionized with a reverse osmosis membrane until the electric conductivity became 0.2 μs. This pigment dispersion (pH=8 to 10) was further concentrated to a pigment concentration of 10 wt %. Thereby, —COONa group was thus introduced onto the surface of the carbon black to make it self-dispersing.

Preparation of Ink

The components below were mixed in a beaker and stirred at 25° C. for 3 hours. Then the mixture was subjected to pressure filtration with a membrane filter of 3.0 μm pore size (available from Sumitomo Electric Industries, Ltd.). Thus obtained was ink for Example 27.

| | |
|---|---|
| pigment dispersion 2 | 30 parts |
| glycerol | 5 parts |
| trimethylolpropane | 5 parts |
| acetyleneglycol ethylene oxide addition product (Trade name: Acetylenol EH, Kawaken Fine Chemicals Co., Ltd.) | 0.2 parts |
| triammonium citrate | 2 parts |
| taurine | 1 part |
| sodium hydroxide | 0.1 parts |
| water | 56.7 parts |

Ink preparation for Example 28

| <Preparation of Pigment dispersion 3> | |
|---|---|
| styrene - acrylic acid copolymer (acid value 200, average molecular weight 7000)] | 5.5 parts |
| monoethanolamine | 1.0 part |
| ion-exchange water | 67.5 parts |
| diethylene glycol | 5.0 parts |

The above components were mixed and heated in a water bath to 70° C., so that the resin component was fully dissolved. Then 20 parts of C.I. Pigment Yellow 93 and 1.0 part of isopropyl alcohol were added to this solution. After premixing for 30 min, the solution was subjected to dispersing treatment under the following conditions:

Disperser: SAND GRINDER

Grinding Media: glass beads 1 mm in diameter

Grinding Media Charge: 50% (volume)

Grinding Time: 3 hours

Then the above solution was subjected to centrifugal dispersing treatment (12000 rpm, 20 minutes) to remove coarse particles. Thus obtained was the pigment dispersion 3.

Preparation of Ink

The components below were mixed in a beaker and stirred at 25° C. for 3 hours. Thus obtained was the ink for Example 28

| | |
|---|---|
| pigment dispersion 3 | 20 parts |
| glycerol | 15 parts |
| diethylene glycol | 10 parts |
| Acetylenol EH (available from Kawaken Fine Chemicals Co., Ltd.) | 0.3 parts |
| triammonium citrate | 2 parts |
| taurine | 1 part |
| sodium hydroxide | 0.1 parts |
| water | 51.6 parts |

Ink preparation for Example 29

| (Preparation of Pigment dispersion 4) | |
|---|---|
| styrene - acrylic acid copolymer (acid value 200, average molecular weight 7000) | 5.5 parts |
| monoethanolamine | 1.0 part |
| ion-exchange water | 67.5 parts |
| diethylene glycol | 5.0 parts |

The above components were mixed and heated in a water bath to 70° C., so that the resin component was fully dissolved. Then 20 parts of C.I. Pigment Red 122 and 1.0 part of isopropyl alcohol were added to this solution. After premixing for 30 minutes, the solution was subjected to dispersing treatment under the following conditions:

Disperser: SAND GRINDER

Grinding Media: glass beads 1 mm in diameter

Grinding Media Charge: 50% (volume)

Grinding Time: 3 hours

Then the above solution was subjected to centrifugal dispersing treatment (12000 rpm, 20 minutes) to remove coarse particles. Thus obtained was the pigment dispersion 4.

Preparation of Ink

The components below were mixed in a beaker and stirred at 25° C. for 3 hours. Thus obtained was an ink of Example 29 for use in the present invention.

| | |
|---|---|
| pigment dispersion 4 | 20 parts |
| glycerol | 15 parts |
| diethylene glycol | 10 parts |
| Acetylenol EH (available from Kawaken Fine Chemicals Co., Ltd.) | 0.3 parts |
| triammonium citrate | 2 parts |
| taurine | 1 part |
| sodium hydroxide | 0.1 parts |
| water | 51.6 parts |

Ink preparation for Example 30

| <Preparation of Pigment dispersion 5> | |
|---|---|
| styrene - acrylic acid copolymer (acid value 200, average molecular weight 7000) | 5.5 parts |
| monoethanolamine | 1.0 part |
| ion-exchange water | 67.5 parts |
| diethylene glycol | 5.0 parts |

The above components were mixed and heated in a water bath to 70° C., so that the resin component was fully dissolved.

Then 20 parts of C.I. Pigment Blue 15:3 and 1.0 part of isopropyl alcohol were added to this solution. After premixing for 30 minutes, the solution was subjected to dispersing treatment under the following conditions:

Disperser: SAND GRINDER

Grinding Media: glass beads 1 mm in diameter

Grinding Media Charge: 50% (volume)

Grinding Time: 3 hours

Then the above solution was subjected to centrifugal dispersing treatment (12000 rpm, 20 minutes) to remove coarse particles. Thus obtained was the pigment dispersion 5.

Preparation of Ink

The components below were mixed in a beaker and stirred at 25° C. for 3 hours. Thus obtained was an ink of Example 30.

| | |
|---|---|
| pigment dispersion 5 | 20 parts |
| glycerol | 15 parts |
| diethylene glycol | 10 parts |
| Acetylenol EH (available from Kawaken Fine Chemicals Co., Ltd.) | 0.3 parts |
| triammonium citrate | 2 parts |
| taurine | 1 part |
| sodium hydroxide | 0.1 parts |
| water | 51.6 parts |

Ink preparation for Comparative Examples 6 to 14

The components shown below were mixed, fully stirred and dissolved, then subjected to pressure filtration with a microfilter of 0.2 μm pore size (from Fuji Photo Film Co., Ltd.) to prepare the inks for use in Comparative Examples 6 to 14. Pigment inks in Comparative Examples 10 to 14 were prepared using the pigment dispersions in Examples 26 to 30.

Ink Composition for Comparative Example 6

| | |
|---|---|
| PROJET FAST BLACK 2 (available from Zeneca) | 3 parts |
| diethylene glycol | 10 parts |
| sodium hydroxide | 0.2 part |
| water | 86.8 parts |

Ink Composition for Comparative Example 7

| | |
|---|---|
| PROJET FAST MAGENTA 2 (available from Zeneca) | 3 parts |
| diethylene glycol | 10 parts |

-continued

| lithium hydroxide | 0.2 part |
|---|---|
| water | 86.8 parts |

Ink Composition for Comparative Example 8

| PROJET FAST CYAN 2 (available from Zeneca) | 4 parts |
|---|---|
| diethylene glycol | 10 parts |
| sodium hydroxide | 0.2 part |
| water | 85.8 parts |

Ink Composition for Comparative Example 9

| PROJET FAST BLACK 2 (available from Zeneca) | 2 parts |
|---|---|
| glycerol | 5 parts |
| diethylene glycol | 5 parts |
| urea | 0.1 parts |
| sodium hydroxide | 0.1 parts |
| ammonium sulfate | 0.1 parts |
| water | 82.8 parts |

Ink Composition for Comparative Example 10

The components below were mixed in a beaker and stirred at 25° C. for 3 hours. Thus obtained was the ink for Comparative Example 10.

| pigment dispersion 1 | 30 parts |
|---|---|
| diethylene glycol | 10 parts |
| 2-propanol | 2 parts |
| sodium hydroxide | 0.1 parts |
| water | 57.9 parts |

Ink Composition for Comparative Example 11

The components below were mixed in a beaker and stirred at 25° C. for 3 hours. Then the mixture was subjected to pressure filtration with a membrane filter (pore size: 3.0 μm, available from Sumitomo Electric Industries, Ltd.). Thus obtained was the ink for Comparative Example 11.

| pigment dispersion 2 | 30 parts |
|---|---|
| glycerol | 5 parts |
| trimethylolpropane | 5 parts |
| acetyleneglycol ethylene oxide addition product (Trade name: Acetylenol EH, Kawaken Fine Chemicals Co., Ltd.) | 0.2 parts |
| sodium hydroxide | 0.1 parts |
| water | 59.7 parts |

Ink preparation for Comparative Example 12

The components below were mixed in a beaker and stirred at 25° C. for 3 hours. Thus obtained was the ink for Comparative Example 12.

| pigment dispersion 3 | 20 parts |
|---|---|
| glycerol | 15 parts |
| diethylene glycol | 10 parts |
| Acetylenol EH (Kawaken Fine Chemicals Co., Ltd.) | 0.3 parts |
| sodium hydroxide | 0.1 parts |
| water | 54.6 parts |

Ink preparation for Comparative Example 13

The components below were mixed in a beaker and stirred at 25° C. for 3 hours. Thus obtained was the ink for Comparative Example 13.

| pigment dispersion 4 | 20 parts |
|---|---|
| glycerol | 15 parts |
| diethylene glycol | 10 parts |
| Acetylenol EH (Kawaken Fine Chemicals Co., Ltd.) | 0.3 parts |
| sodium hydroxide | 0.1 parts |
| water | 54.6 parts |

Ink preparation for Comparative Example 14

The components below were mixed in a beaker and stirred at 25° C. for 3 hours. Thus obtained was the ink for Comparative Example 14.

| pigment dispersion 5 | 20 parts |
|---|---|
| glycerol | 15 parts |
| diethylene glycol | 10 parts |
| Acetylenol EH (Kawaken Fine Chemicals Co., Ltd.) | 0.3 parts |
| sodium hydroxide | 0.1 parts |
| water | 54.6 parts |

Evaluation 2

With inks of Examples 13 to 30 and Comparative Examples 6 to 14, evaluation was carried out as follows. First, Vth (threshold voltage for ejecting ink) was determined at pulse widths of 1.1 μs (on)+3.0 μs (off)+3.2 μs (on) and an operation frequency of 6250 Hz, using each ink and an ink-jet recording apparatus having an on-demand type multiple recording head (BC-02, from Canon Inc.), where the outermost protection layer on the heater consists of tantalum and oxide thereof) and ink is ejected by applied thermal energy according to recording signals. Then applying a Vop corresponding to r=1.39, ink ejection was carried out, and the ejection durability and kogation on the heater surface were evaluated for each ink in the same manner as in Evaluation 1. The results are shown in Tables 2.

Ejection Durability

A continuous ejection with each ink of Examples 13 to 30 and Comparative Examples 6 to 14 was performed by using the above apparatus and operation conditions. The ink droplets of $1\times10^6$ shots, ejected from the recording head, were collected in a container and weighed with the container by an electronic balance. The average ink droplet weight during $1\times10^6$ shots was calculated from the weight increase. The continuous ejection was performed for a total of $1\times10^8$ shots. The evaluation criteria were categorized as follows, and the results are shown in Tables 3 and 4.

A: The average weight of the ink droplets ejected during $9.9 \times 10^7$ to $1 \times 10^8$ shots is 90% or more of that during 0 to $1 \times 10^6$ shots.
B: The average weight of the ink droplets ejected during $9.9 \times 10^7$ to $1 \times 10^8$ shots is from 70% and less than 90% of that during 0 to $1 \times 10^6$ shots.
C: The average weight of the ink droplets ejected during $9.9 \times 10^7$ to $1 \times 10^8$ shots is less than 70% of that during 0 to $1 \times 10^6$ shots.
D: Ejection stopped before $1 \times 10^8$ shots.

(2) Amount of Koga

The recording head having been subjected to the above ejection durability evaluation was disassembled, and the surface of the heater in the nozzle was observed under an optical microscope (X400 magnifications). The amount of koga was evaluated using the following criteria:

A: Little koga was observed;
B: A little koga was observed;
C: Certain amount of koga was observed;
D: Large amount of koga was observed.

Advantage of the Invention

As described above, the present invention provides an ink, for use in an ink-jet recording utilizing thermal energy, which enables elongation of the life of a recording head by decreasing kogation on the heater thereof, a method for increasing the life of the recording head by decreasing kogation on the heater thereof, a method for ink-jet printing utilizing the above ink, and an ink-jet recording apparatus for the ink.

TABLE 1

Evaluation Results of Examples 1 to 12

| Examples | Main Ink Component (c) | (d) | Vth (V) | r value Eop/Eth | Vop (V) | Ejection durability | Kogation |
|---|---|---|---|---|---|---|---|
| 1 | triammonium citrate 2 parts | taurine 2 parts | 20.9 | 1.39 | 24.6 | A | A |
| 2 | *1 | *1 | 20.9 | 1.10 | 21.9 | A | A |
| 3 | *1 | *1 | 21.0 | 1.49 | 25.7 | A | A |
| 4 | *1 | *1 | 20.8 | 1.72 | 27.3 | A | A |
| 5 | *1 | sulfamic acid 2 parts | 21.0 | 1.72 | 27.5 | A | A |
| 6 | *1 | amonomethane sulfonic acid 2 parts | 20.9 | 1.72 | 27.4 | A | A |
| 7 | succinic acid 2 parts | taurine 1 part | 20.9 | 1.72 | 27.4 | A | A |
| 8 | triammonium citrate 2 parts | L-glutamic acid 2 parts | 21.0 | 1.72 | 27.5 | A | B |
| 9 | diammonium citrate 2 parts | L-aspartic acid 2 parts | 20.8 | 1.72 | 27.3 | A | B |
| 10 | sodium gluconate 2 parts | taurine 2 parts | 20.8 | 1.72 | 27.3 | A | A |
| 11 | disodium phosphate 2 parts | taurine 2 parts | 20.8 | 1.72 | 27.3 | A | A |
| 12 | β-glyucero-phosphate 2Na (5 hydrate) 2 parts | taurine 3 parts | 20.8 | 1.72 | 27.3 | A | A |

Vth: Threshold voltage for ejection (observed value)
Vop: Operation voltage (voltage at the operation)
*1: Same as the above

TABLE 2

Evaluation Results of Comparative Examples 1 to 5

| Comparative Examples | Main Ink Components (c) | Main Ink Components (d) | Vth (V) | r value Eop/Eth | Vop (V) | Ejection durability | Kogation |
|---|---|---|---|---|---|---|---|
| 1 | none | none | 20.9 | 1.72 | 27.4 | C | D |
| 2 | none | none | 20.8 | 1.72 | 27.3 | C | D |
| 3 | none | none | 21.0 | 1.72 | 27.5 | C | D |
| 4 | none | none | 20.8 | 1.72 | 27.3 | D | C |
| 5 | none | none | 21.0 | 1.72 | 27.5 | C | C |

Vth: Threshold voltage for ejection (observed value)
Vop: Operation voltage (voltage at the operation)

TABLE 3

Evaluation Results of Examples 13 to 30

| Example | Main Ink Components (c) | Main Ink Components (d) | Coloring Material | Vth (V) | r value Eop/Eth | Vop (V) | Ejection durability | Kogation |
|---|---|---|---|---|---|---|---|---|
| 13 | DL-malic acid 2 parts | sulfamic acid 1 part | PROJET FAST BLACK 2 2 parts | 20.8 | 1.39 | 24.5 | A | A |
| 14 | sodium tartarate (dihydrate) 2 parts | aminomethane sulfonic acid 1 part | *1 | 21.0 | 1.39 | 24.8 | A | A |
| 15 | sodium lactate 50% soln 2 parts | taurine 0.5 parts | *1 | 21.0 | 1.39 | 24.8 | A | A |
| 16 | trisodium citrate (dihydrate) 2 parts | taurine 1 part | *1 | 21.0 | 1.39 | 24.8 | A | A |
| 17 | ammonium lactate 50% soln 2 parts | L-glutamic acid 2 parts | *1 | 21.2 | 1.39 | 25 | A | A |
| 18 | diammonium citrate 2 parts | L-aspartic acid 2 parts | *1 | 21.5 | 1.39 | 25.3 | A | A |
| 19 | δ-glucono-lactone 2 parts | taurine 1 part | *1 | 21.0 | 1.39 | 24.8 | A | A |
| 20 | sodium diphosphate 2 parts | taurine 3 parts | *1 | 21.1 | 1.39 | 24.9 | A | A |
| 21 | β-glycero-phosphate 2Na (5 hydrate) 2 parts | taurine 1 part | *1 | 20.9 | 1.39 | 24.6 | A | A |
| 22 | triammonium citrate 2 parts | *1 | PROJET FAST YELLOW 2 3 parts | 21.3 | 1.39 | 25.1 | A | A |
| 23 | *1 | *1 | PROJET FAST MAGENTA 2 3 parts | 21.0 | 1.39 | 24.8 | A | A |
| 24 | *1 | *1 | PROJET FAST CYAN 2 2 parts | 21.0 | 1.39 | 24.8 | A | A |
| 25 | *1 | *1 | PROJET FAST BLACK 2 2 parts | 21.0 | 1.39 | 24.8 | A | A |
| 26 | *1 | *1 | carbon black 4.5 parts | 21.0 | 1.39 | 24.8 | A | A |
| 27 | *1 | *1 | carbon black (COONa) 3 parts | 21.0 | 1.39 | 24.8 | A | A |
| 28 | *1 | *1 | C.I. Pigment Yellow 93 4 parts | 21.5 | 1.39 | 25.3 | A | A |
| 29 | *1 | *1 | C.I. Pigment Red 122 4 parts | 21.0 | 1.39 | 24.8 | A | A |
| 30 | *1 | *1 | C.I. Pigment Blue 15:3 4 parts | 21.0 | 1.39 | 24.8 | A | A |

TABLE 3-continued

Evaluation Results of Examples 13 to 30

| Example | Main Ink Components (c) | (d) | Coloring Material | Vth (V) | r value Eop/Eth | Vop (V) | Ejection durability | Kogation |
|---|---|---|---|---|---|---|---|---|

Vth: Threshold voltage for ejection (observed value)
Vop: Operation voltage (voltage at the operation)
*1: Same as the above

TABLE 4

Evaluation Results of Comparative Examples 6 to 14

| Comparative Examples | Main Ink Components (c) | (d) | Coloring material | Vth (V) | r value Eop/Eth | Vop (V) | Ejection durability | Kogation |
|---|---|---|---|---|---|---|---|---|
| 6 | none | none | PJ FAST Y2 3 parts | 21.3 | 1.39 | 25.1 | B | C |
| 7 | none | none | PJ FAST M2 3 parts | 21.0 | 1.39 | 24.8 | C | C |
| 8 | none | none | PJ FAST C2 4 parts | 21.0 | 1.39 | 24.8 | B | C |
| 9 | none | none | PJ FAST Bk2 2 parts | 21.1 | 1.39 | 24.9 | B | C |
| 10 | none | none | carbon black 4.5 parts | 21.2 | 1.39 | 25.0 | C | C |
| 11 | none | none | carbon black (COONa) 3 parts | 21.5 | 1.39 | 25.3 | C | C |
| 12 | none | none | C.I. Pigment Y-93 4 parts | 21.2 | 1.39 | 25.0 | C | C |
| 13 | none | none | C.I. Pigment R-122 4 parts | 21.0 | 1.39 | 24.8 | C | C |
| 14 | none | none | C.I. Pigment B15:3 4 parts | 21.1 | 1.39 | 24.9 | C | C |

Vth: Threshold voltage for ejection (observed value)
Vop: Operation voltage (voltage at the operation)

What is claimed is:

1. An ink comprising:
 (a) a coloring material,
 (b) a liquid medium,
 (c) a compound selected from the group consisting of polyphosphoric acid, dicarboxylic acid, polyaminocarboxylic acid, aldonic acid, hydroxycarboxylic acid, polyolphosphate and salts thereof, and
 (d) an acid having an amino group and/or a salt thereof, wherein the hydroxycarboxylic acid is at least one of citric acid and tartaric acid.

2. An ink comprising:
 (a) a coloring material,
 (b) a liquid medium,
 (c) a compound selected from the group consisting of polyphosphoric acid, dicarboxylic acid, polyaminocarboxylic acid, aldonic acid, hydroxycarboxylic acid, polyolphosphate and salts thereof, and
 (d) an acid having an amino group and/or a salt thereof, wherein the aldonic acid is gluconic acid.

3. An ink comprising:
 (a) a coloring material,
 (b) a liquid medium,
 (c) a compound selected from the group consisting of polyphosphoric acid, dicarboxylic acid, polyaminocarboxylic acid, aldonic acid, hydroxycarboxylic acid, polyolphosphate and salts thereof, and
 (d) an acid having an amino group and/or a salt thereof, wherein the polyolphosphate is at least one selected from the group consisting of α-glycerophosphoric acid and β-glycerophosphoric acid.

4. An ink comprising:
 (a) a coloring material,
 (b) a liquid medium,
 (c) a compound selected from the group consisting of polyphosphoric acid, dicarboxylic acid, polyaminocarboxylic acid, aldonic acid, hydroxycarboxylic acid, polyolphosphate and salts thereof, and
 (d) an acid having an amino group and/or a salt thereof, wherein the component (d) is at least one selected from the group consisting of amidosulfuric acid, aminomethanesulfonic acid, taurine, carbamic acid, glycine, alanine, and aspartic acid, and glutamic acid.

5. An ink comprising:
 (a) a coloring material,
 (b) a liquid medium,
 (c) a compound selected from the group consisting of polyphosphoric acid, dicarboxylic acid, polyaminocarboxylic acid, aldonic acid, hydroxycarboxylic acid, polyolphosphate and salts thereof, and (d) an acid having an amino group and/or a salt thereof, wherein the component (d) is an acid having an amino group and a sulfonic acid group or a salt thereof, wherein the component (d) is at least one selected from the group consisting of amidosulfuric acid, aminomethanesulfonic acid, and taurine.

* * * * *

UNITED STATES PATENT AND TRADEMARK OFFICE
CERTIFICATE OF CORRECTION

PATENT NO.     : 6,513,922 B2
DATED          : February 4, 2003
INVENTOR(S)    : Ryuji Katsuragi et al.

It is certified that error appears in the above-identified patent and that said Letters Patent is hereby corrected as shown below:

<u>Title page,</u>
Item [56], References Cited, OTHER PUBLICATIONS, "Output Hardcopy Devices by Robert C. Durbeck.*" (first occurrence) should be deleted.
"Chpter." should read -- Chapter --.

<u>Column 13,</u>
Line 53, "0.3 part" should read -- 0.3 parts --.

<u>Column 14,</u>
Line 7, "0.3 part" should read -- 0.3 parts --.
Line 17, "0.2 part" should read -- 0.2 parts --.

<u>Column 18,</u>
Line 67, "28" should read -- 28. --.

<u>Column 20,</u>
Line 57, "0.2 part" should read -- 0.2 parts --.

<u>Column 21,</u>
Lines 3 and 13, "0.2 part" should read -- 0.2 parts --.

<u>Column 25,</u>
Line 27, Table 3, "Example" should read -- Examples --.

<u>Column 27,</u>
Line 7, Table 3, "Example" should read -- Examples --.

Signed and Sealed this

Twenty-seventh Day of January, 2004

JON W. DUDAS
*Acting Director of the United States Patent and Trademark Office*